United States Patent
Wang et al.

(10) Patent No.: US 12,074,832 B2
(45) Date of Patent: Aug. 27, 2024

(54) UNREAD MESSAGE DISPLAY METHOD, ELECTRONIC DEVICE, AND STORAGE MEDIUM

(71) Applicant: Beijing Zitiao Network Technology Co., Ltd., Beijing (CN)

(72) Inventors: Junqiang Wang, Beijing (CN); Jiannan Xu, Beijing (CN); Ziyang Zheng, Beijing (CN); Jia Qu, Beijing (CN); Weiyi Chang, Beijing (CN); Yuxuan Zhao, Beijing (CN)

(73) Assignee: Beijing Zitiao Network Technology Co., Ltd. (CN)

( * ) Notice: Subject to any disclaimer, the term of this patent is extended or adjusted under 35 U.S.C. 154(b) by 0 days.

(21) Appl. No.: 18/210,780

(22) Filed: Jun. 16, 2023

(65) Prior Publication Data

US 2023/0325053 A1    Oct. 12, 2023

Related U.S. Application Data

(63) Continuation of application No. PCT/CN2021/134948, filed on Dec. 2, 2021.

(30) Foreign Application Priority Data

Dec. 17, 2020    (CN) .......................... 202011496564.0

(51) Int. Cl.
*H04L 51/04* (2022.01)
*G06F 3/04817* (2022.01)
(Continued)

(52) U.S. Cl.
CPC .......... *H04L 51/04* (2013.01); *G06F 3/04817* (2013.01); *G06F 3/0482* (2013.01);
(Continued)

(58) Field of Classification Search
CPC ..... H04L 51/224; H04L 51/216; H04L 51/56; H04L 51/04; G06F 3/0483; G06F 3/0482;
(Continued)

(56) References Cited

U.S. PATENT DOCUMENTS 6,643,360 B1    11/2003    Reine
7,120,455 B1    10/2006    Chen et al.
(Continued)

FOREIGN PATENT DOCUMENTS

CN    104301204 A    1/2015
CN    104967721 A    10/2015
(Continued)

OTHER PUBLICATIONS

WeChat Message Types, Wayback Machine, https://web.archive.org/web/20191026074855/https://doc.stella.sanuker.com/docs/en/wechat-message-types/, Oct. 26, 2019 (Year: 2019).*
(Continued)

*Primary Examiner* — Nicholas Ulrich

(57) ABSTRACT

Provided are an unread message display method, an electronic device, and a storage medium. The method includes the following: A message list page is displayed, and an unread message thumbnail is displayed on the message list page. A first trigger operation acting on a target unread message thumbnail is received. In response to the first trigger operation, an unread message display area is displayed; and a target unread message corresponding to the target unread message thumbnail is displayed in the unread message display area. A second trigger operation for switching the current unread message displayed in the unread message display area is received. In response to the second trigger operation, the current unread message displayed in
(Continued)

the unread message display area is switched to an unread message sent by a target sending user other than the current unread message.

20 Claims, 7 Drawing Sheets

(51) Int. Cl.
 *G06F 3/0482* (2013.01)
 *G06F 3/0484* (2022.01)
 *H04L 51/216* (2022.01)
 *H04M 1/7243* (2021.01)

(52) U.S. Cl.
 CPC .......... *G06F 3/0484* (2013.01); *H04L 51/216* (2022.05); *H04M 1/7243* (2021.01)

(58) Field of Classification Search
 CPC . G06F 3/04817; G06F 3/0484; H04M 1/7243
 See application file for complete search history.

(56) References Cited

U.S. PATENT DOCUMENTS

| | | | | |
|---|---|---|---|---|
| 2016/0313877 | A1* | 10/2016 | Ha | G06F 3/04842 |
| 2018/0300710 | A1* | 10/2018 | Wen | G06Q 20/3224 |
| 2020/0367026 | A1 | 11/2020 | Wu et al. | |
| 2020/0396191 | A1* | 12/2020 | Yang | H04L 51/42 |

FOREIGN PATENT DOCUMENTS

| | | |
|---|---|---|
| CN | 105653132 A | 6/2016 |
| CN | 106325671 A | 1/2017 |
| CN | 106708372 A | 5/2017 |
| CN | 107872377 A | 4/2018 |
| CN | 108021316 A | 5/2018 |
| CN | 108920059 A | 11/2018 |
| CN | 110134484 A | 8/2019 |
| CN | 110837327 A | 2/2020 |
| CN | 111857500 A | 10/2020 |
| CN | 112286416 A | 1/2021 |
| EP | 2857960 A1 | 4/2015 |

OTHER PUBLICATIONS

Second Chinese Office Action mailed on Mar. 29, 2023 in Chinese Patent Application No. 2020114965640.
International Search Report issued Feb. 16, 2022 in International Application No. PCT/CN2021/134948, with English translation (4 pages).
First Office Action issued Oct. 10, 2022 in Chinese Application No. 202011496564.0, with English translation (10 pages).
Second Office Action issued Mar. 29, 2023 in Chinese Application No. 202011496564.0, with English translation (9 pages).
Supplemental Search Report issued on Jul. 13, 2023 in Chinese Patent Application No. 2020114965640, with English translation (8 pages).
Dimitris I. Rigas, et al., "Multimedia E-Mail Data Browsing: The Synergistic Use of Various Forms of Auditory Stimuli," Conference Paper, May 2003 (8 pages).
Zhou Shixiong, "Design and Implementation of Instant Messaging System for Mobile Platform Based on XMPP Protocol," Dissertation for Master's Degree in Engineering, Mar. 15, 2014, with English Abstract (85 pages).
European Search Report for EP Patent Application No. 21905533.2, Issued on Apr. 2, 2024, 4 pages.

* cited by examiner

UNREAD MESSAGE DISPLAY METHOD, ELECTRONIC DEVICE, AND STORAGE MEDIUM

CROSS-REFERENCE TO RELATED APPLICATIONS

This is a continuation of International Patent Application No. PCT/CN2021/134948, filed on Dec. 2, 2021, which claims priority to Chinese Patent Application No. 202011496564.0 filed with the China National Intellectual Property Administration (CNIPA) on Dec. 17, 2020, the disclosures of which are incorporated herein by reference in their entireties.

TECHNICAL FIELD

The present disclosure relates to the field of computer technology, for example, an unread message display method, an electronic device, and a storage medium.

BACKGROUND

At present, a message page used for placing messages that are received by a user and sent by friends of the user generally adopts a three-layer design in an instant messaging (IM) product.

The core of the three-layer design is storage, aiming at letting the user quickly identify which friends have sent messages to the user. In some three-layer designs, a prompt mark is added. That is, the prompt mark is uniformly added for friends with unread messages on the message page so that the user can distinguish a friend with an unread message more quickly and enter a session page with this friend to view the unread message sent by this friend.

However, when unread messages sent by a friend are arranged discontinuously on the session page, the user needs to find multiple unread messages one by one to read. The operation is cumbersome, and it is easy to miss an unread message.

SUMMARY

Embodiments of the present disclosure provide an unread message display method, an electronic device, and a storage medium to simplify an operation required for viewing an unread message.

An embodiment of the present disclosure provides an unread message display method. The method includes the steps below.

A message list page is displayed, where an unread message thumbnail is displayed on the message list page.

A first trigger operation acting on a target unread message thumbnail is received.

In response to the first trigger operation, an unread message display area is displayed; and a target unread message corresponding to the target unread message thumbnail is displayed in the unread message display area.

A second trigger operation for switching a current unread message displayed in the unread message display area is received, where the current unread message includes the target unread message.

In response to the second trigger operation, the current unread message displayed in the unread message display area is switched to an unread message sent by a target sending user other than the current unread message, where the target sending user is a user sending the target unread message.

An embodiment of the present disclosure further provides an electronic device. The electronic device includes at least one processor and a memory configured to store at least one program.

When executed by the at least one processor, the at least one program causes the at least one processor to perform the unread message display method according to embodiments of the present disclosure.

An embodiment of the present disclosure further provides a computer-readable storage medium for storing a computer program. When executed by a processor, the computer program causes the processor to implement the unread message display method according to embodiments of the present disclosure.

DETAILED DESCRIPTION

Embodiments of the present disclosure are described in more detail hereinafter with reference to the drawings.

It is to be understood that the various steps recited in the method embodiments of the present disclosure may be performed in a different order, and/or in parallel. Additionally, the method embodiments may include additional steps and/or omit the steps shown. The scope of the present disclosure is not limited in this respect.

The term "include" or its variant used herein means "include, but not limited to". The term "based on" means "at least partially based on". The term "an embodiment" means "at least one embodiment". The term "another embodiment" means "at least one other embodiment". The term "some embodiments" means "at least some embodiments". Related definitions of other terms are given in the description hereinafter.

It is to be noted that references to "first", "second" and the like in the present disclosure are merely intended to distinguish different apparatuses, modules, or units one from another and are not intended to limit the order or interrelationship of functions performed by these apparatuses, modules, or units.

It is to be noted that reference to modification of "one" or "a plurality" in the present disclosure is intended to be illustrative and not limiting, and that those skilled in the art should understand that "at least one" is intended unless the context clearly indicates otherwise.

The names of messages or information exchanged among multiple apparatuses in embodiments of the present disclosure are illustrative and not to limit the scope of the messages or information.

Figure 1:
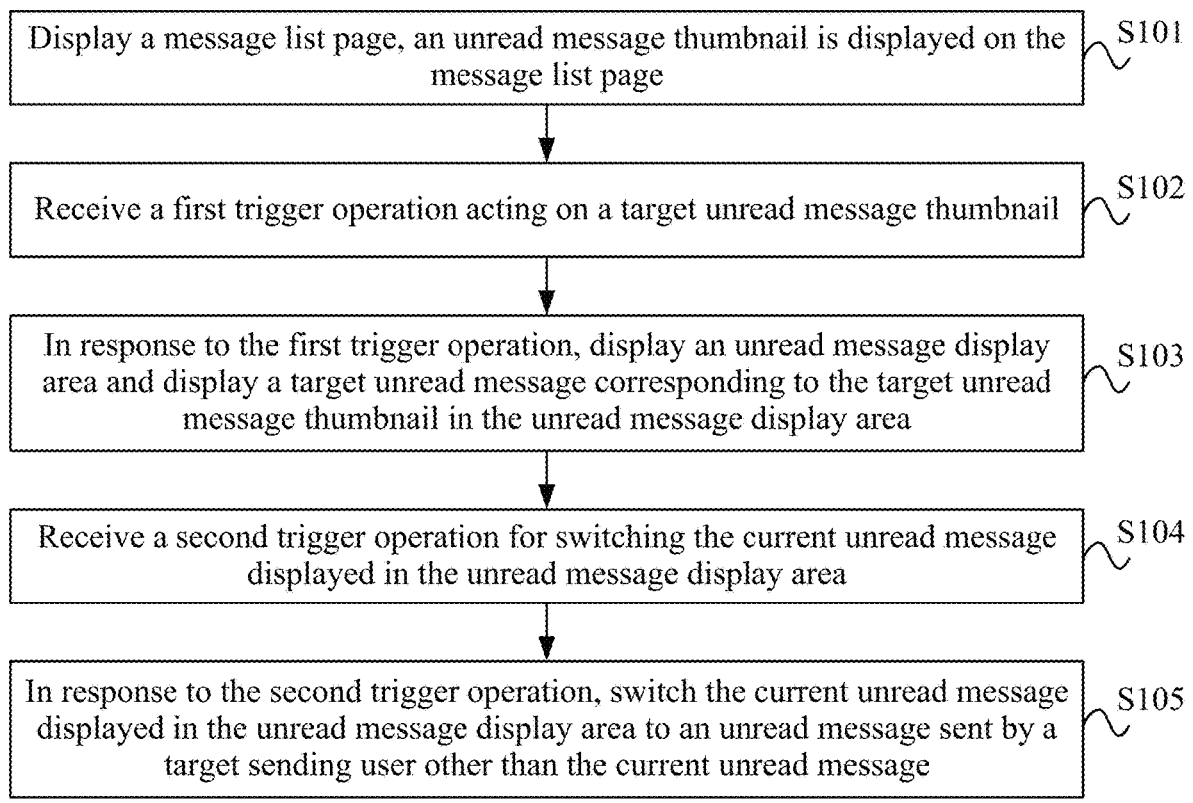
FIG. 1 is a flowchart of an unread message display method according to an embodiment of the present disclosure.

FIG. 1 is a flowchart of an unread message display method according to an embodiment of the present disclosure. The method may be performed by an unread message display apparatus. The apparatus may be implemented in software and/or hardware and may be configured in an electronic device such as a mobile phone or a tablet computer. The unread message display method provided by the embodiment of the present disclosure is applicable to a scenario of viewing at least one unread message sent by other users and, in particular, a scenario of viewing multiple unread messages sent by other users. As shown in FIG. 1, the unread message display method according to this embodiment may include the following:

In S101, a message list page is displayed, and an unread message thumbnail is displayed on the message list page.

The message list page may be understood as any page used for pushing a message sent by at least one another user to an initiating user, for example, a message list page in an instant messaging application. The initiating user may be understood as a user instructing the electronic device to display the message list page and also the user initiating a subsequent trigger operation. The unread message thumbnail may be understood as the thumbnail of an unread message received by the initiating user. The unread message may be understood as a message that the initiating user has not read and may include any type of unread message, for example, a text message whose message content is text, a video message whose message content is a video, a voice message whose message content is voice, a to-be-collected red envelope message whose message content is a red envelope, a special-effect sharing message whose message content is a special effect, a live room invitation message for inviting the initiating user to enter a live room, a chat room invitation message for inviting the initiating user to enter a chat room, a game invitation message for inviting the initiating user to enter a game, and/or a link-type message whose message content is a link.

Exemplarily, when the initiating user intends to view the message list page, a corresponding trigger operation may be performed, for example, an operation of clicking a message button at the bottom of the current display page. Accordingly, when detecting that the initiating user performs a trigger operation for displaying the message list page, the electronic device may display the message list page and display user information of at least one sending user (that is, at least one user who sends an unread message to the initiating user) with an unread message and the unread message thumbnail of the at least one sending user on the message list page.

Figure 2:
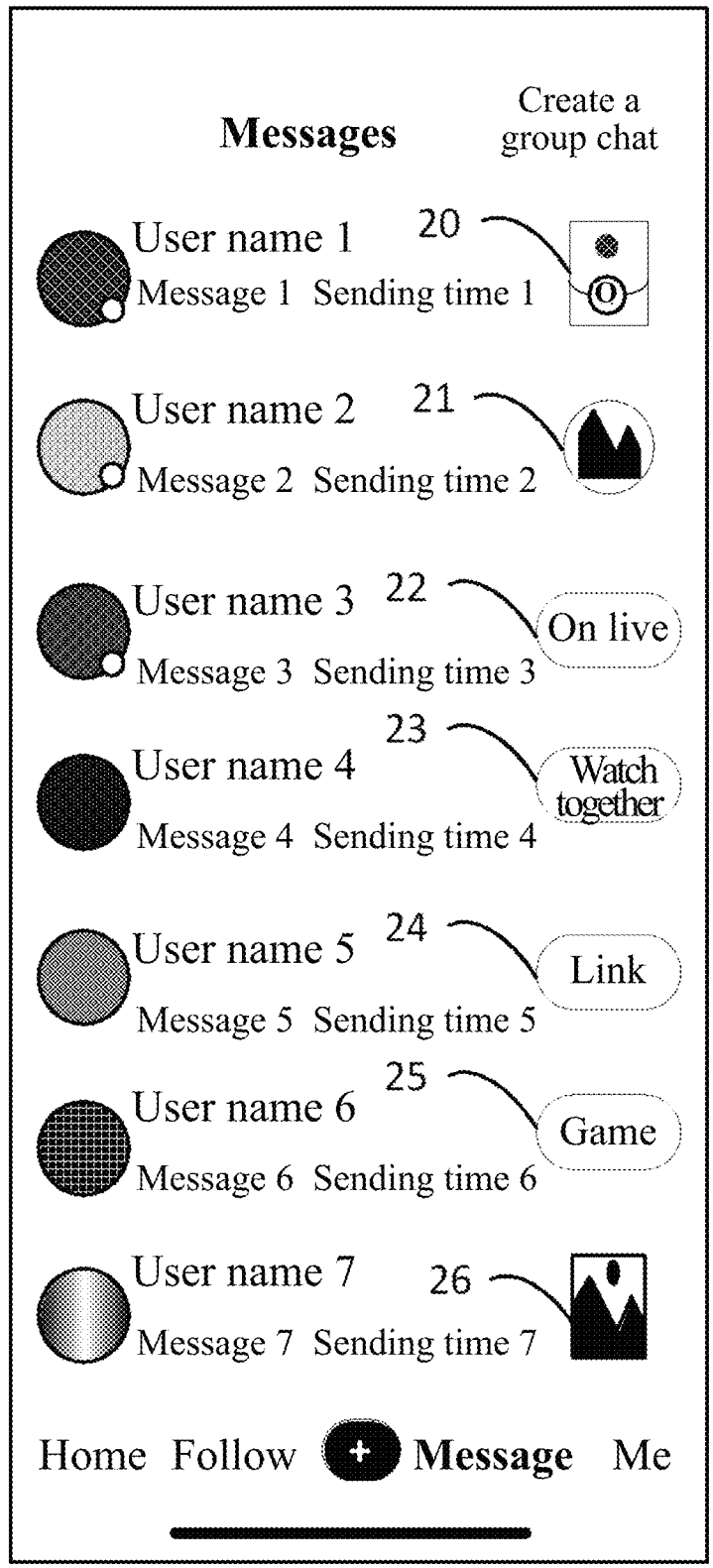
FIG. 2 is a diagram illustrating a message list page according to an embodiment of the present disclosure.

In this embodiment, as shown in FIG. 2, user information of at least one another user (including a sending user and a non-sending user) having a message interaction with the initiating user (that is, a user has sent a message to the initiating user and/or a user has received a message from the initiating user) may be displayed on the display page, for example, the user information may be a user avatar, a user name, and/or part or all of the content of the last message sent to the initiating user. When the sending user exists, the unread message thumbnail of the unread message sent by at least one sending user is also displayed on the message list page, for example, a text unread message thumbnail (not shown in FIG. 2), a voice unread message thumbnail (not shown in FIG. 2), a red envelope unread message thumbnail (reference sign 20), a special-effect unread message thumbnail (reference sign 21), a live room unread message thumbnail (reference sign 22), a chat room unread message thumbnail (reference sign 23), a link unread message thumbnail (reference sign 24), a game unread message thumbnail (reference sign 25), and/or a video unread message thumbnail (reference sign 26). In this case, the initiating user may view an unread message sent by the corresponding sending user by triggering a certain unread message thumbnail. Additionally, to enable the initiating user to distinguish between different types of unread messages, different types of unread messages may have different unread message thumbnails. When a certain sending user has sent multiple types of unread messages, unread message thumbnails of these multiple types of unread messages of the sending user may be displayed on the message list page separately. Alternatively, only the unread message thumbnail of one type of unread message may be displayed, for example, the unread message thumbnail of the last unread message sent by the user is displayed, or the unread message thumbnail of an unread message whose message type has the highest priority among the multiple unread messages is displayed. When a certain sending user has sent multiple unread messages of the same message type, unread message thumbnails of the multiple unread messages in such message type may be displayed separately; alternatively, only the unread message thumbnail of one unread message in such message type may be displayed, for example, the unread message thumbnail of the last unread message in such message type sent by the sending user is displayed. The case in which only the unread message thumbnail of a certain unread message sent by each sending user is displayed on the message list page separately is taken as an example for description hereinafter.

In S102, a first trigger operation acting on a target unread message thumbnail is received.

The target unread message thumbnail may be understood as an unread message thumbnail on which the first trigger operation acts. A target sending user may be understood as a sending user corresponding to the target unread message thumbnail, that is, a user of the unread message corresponding to the target unread message thumbnail.

Exemplarily, the electronic device displays the message list page and displays the unread message thumbnail of a certain unread message sent by each sending user on the message list page. When intending to view an unread message corresponding to an unread message thumbnail, the initiating user triggers (for example, clicks or drags) the unread message thumbnail displayed on the message list page. Alternatively, when intending to view an unread message sent by a certain sending user, the initiating user triggers the unread message thumbnail of the sending user displayed on the message list page. Accordingly, when detecting that the initiating user triggers a certain unread message thumbnail on the message list page, the electronic device determines that the first trigger operation is received. Moreover, the unread message thumbnail may be taken as the target unread message thumbnail, and the sending user corresponding to the unread message thumbnail is taken as the target sending user.

In S103, in response to the first trigger operation, an unread message display area is displayed, and a target unread message corresponding to the target unread message thumbnail is displayed in the unread message display area.

Figure 3:
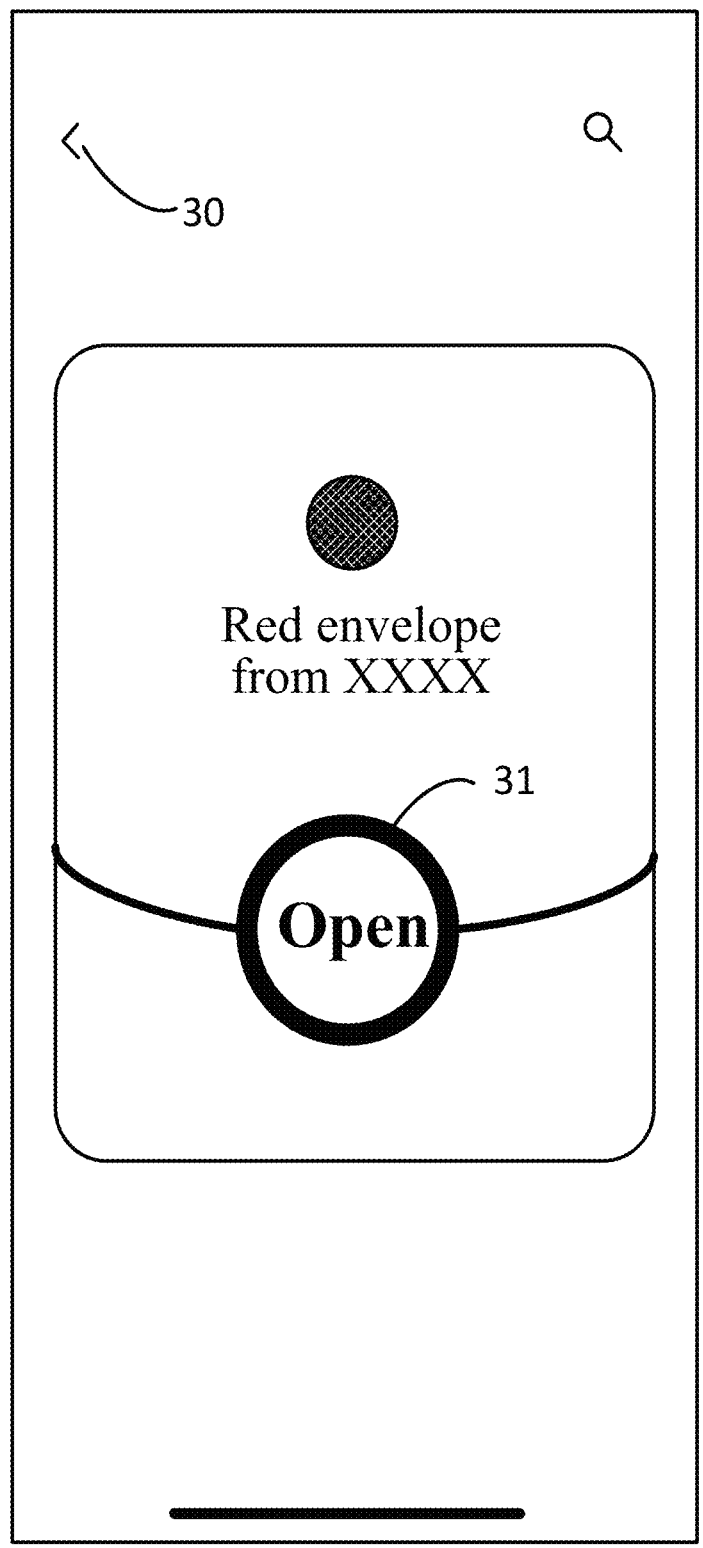
FIG. 3 is a diagram illustrating an unread message display area according to an embodiment of the present disclosure.
Figure 4:
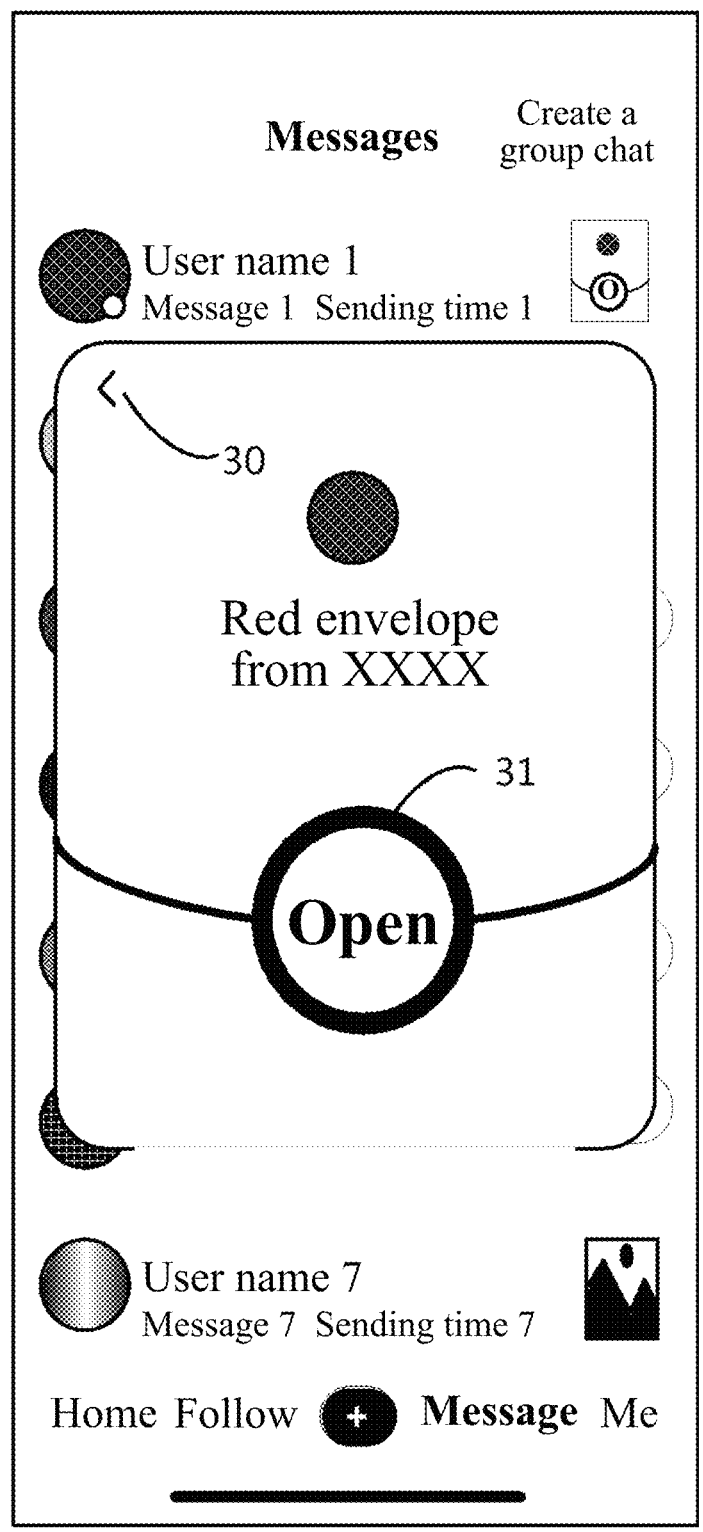
FIG. 4 is a diagram illustrating another unread message display area according to an embodiment of the present disclosure.

The target unread message may be the unread message corresponding to the target unread message thumbnail. The unread message display area may be understood as an area for displaying an unread message. The unread message display area may be located on another page different from the message list page, as shown in FIG. 3 (FIG. 3 illustrates an example of displaying a to-be-collected red envelope). Alternatively, the unread message display area may also be located in an upper layer of the message list page. For example, the unread message display area may be displayed above the message list page in a floating layer or a pop-up window so as to implement the display of an unread message without page switching, as shown in FIG. 4 (FIG. 4 illustrates an example of displaying a to-be-collected red envelope). Accordingly, the target unread message may be displayed on another page different from the message list page or may be displayed in a floating layer or a pop-up window located in the upper layer of the message list page. When the unread message display area is displayed in the upper layer of the message list page, the dimension of the unread message display area may be preset or may be determined according to the message type or message content of an unread message to be displayed currently. That is, when the message type and/or the message content is different, the dimension of the unread message display area may be the same or may be different.

Exemplarily, when detecting the first trigger operation, the electronic device switches the current display page from the message list page to the display page of the unread message display area and displays the target unread message corresponding to the target unread message thumbnail in the unread message display area on the page. Alternatively, when detecting the first trigger operation, the electronic device displays the unread message display area in the layer above the current display page and displays the target unread message corresponding to the target unread message thumbnail in the unread message display area.

It is to be understood that a display manner (for example, displaying the unread message display area in the upper layer of the message list page or displaying the unread message display area on another page independent of the message list page) of a message display page corresponding to each type of unread message may also be preset in this embodiment. Therefore, when receiving the first trigger operation, the electronic device first determines the message type of the target unread message corresponding to the target unread message thumbnail, then displays the message display page through the display manner corresponding to the message type of the target unread message, and displays the target unread message on the message display page. For example, when the target unread message is a to-be-collected red envelope, the unread message display area may be directly displayed above the message list page. When the target unread message is a video message, the unread message display area may be displayed on another page independent of the message list page.

In an embodiment, the target unread message is an interactive unread message. The method also includes that an interactive control is displayed in the unread message display area and when an interactive trigger operation acting on the interactive control is received, an interactive operation corresponding to the interactive control is performed.

The interactive unread message may be understood as a message that is capable of being triggered, for example, a to-be-collected red envelope, a special-effect sharing message, a room invitation message, and a game invitation message. The interactive trigger operation may be understood as a trigger operation acting on the interactive control of an interactive message. The interactive operation may be an operation of the initiating user interacting with the electronic device or another user.

Exemplarily, when receiving the first trigger operation, the electronic device may display the unread message display area and display the target unread message corresponding to the target unread message thumbnail and the interactive control of the target unread message in the unread message display area. Therefore, when intending to perform an interaction, the initiating user may click the interactive control displayed in the unread message display area. Accordingly, when detecting that the initiating user clicks the interactive control displayed in the unread message display area, the electronic device may perform the preset interactive operation when the interactive control is triggered, for example, collecting the to-be-collected red envelope (regarding the case where the target unread message is a to-be-collected red envelope), shooting by using a corresponding special effect (regarding the case where the target unread message is a special-effect invitation message), interacting with another user in a room (regarding the case where the target unread message is a room invitation message), or performing a corresponding game operation (regarding the case where the target unread message is a game invitation message).

In S104, a second trigger operation for switching the current unread message displayed in the unread message display area is received, and the current unread message includes the target unread message.

The current unread message may be understood as an unread message displayed in the unread message display area when the second trigger operation is received, that is, the last unread message displayed in the unread message display area before a response to the second trigger operation is performed. The second trigger operation may be any operation capable of instructing the electronic device to switch the unread message that is sent by the target sending user and displayed in the unread message display area. For example, the unread message display area may be provided with a message switching control for switching the unread message sent by the target sending user and displayed in the unread message display area. Accordingly, the second trigger operation may be an operation of clicking the message switching control. Alternatively, the second trigger operation may be a slide operation in the unread message display area, for example, an upward or downward slide operation or a leftward or rightward slide operation. An example in which the second trigger operation is an upward or downward slide operation acting on the unread message display area is taken for description hereinafter.

Exemplarily, the electronic device displays an unread message (for example, the target unread message) sent by a certain sending user (for example, the target sending user) in the unread message display area. When intending to view the next unread message of the unread message currently displayed in the unread message display area, the initiating user may slide upward in the unread message display area. When intending to view the previous unread message of the unread message currently displayed in the unread message display area, the initiating user may slide downward in the unread message display area. Accordingly, when detecting the upward or downward slide operation (for example, an operation of sliding upward or an operation of sliding downward) of the initiating user in the unread message display area, the electronic device may determine that the second trigger operation is received.

In S105, in response to the second trigger operation, the current unread message displayed in the unread message display area is switched to an unread message sent by the target sending user other than the current unread message, and the target sending user is a user sending the target unread message.

The unread message other than the current unread message may be the previous unread message of the unread message displayed on the message list page, the next unread message of the unread message displayed on the message list page, or any unread message other than the current unread message. The unread message other than the current unread message may be an unread message whose message type is the same as or different from that of the current unread message. That is, the unread message other than the current unread message may include an unread message having a different message type from the current unread message. That is, this embodiment does not limit the message type of an unread message displayed in the unread message display area. Any unread message received by the initiating user can be displayed in the unread message display area.

By way of example, the second trigger operation is an upward or downward slide operation acting on the message display page. When detecting an upward slide operation acting on the unread message display area, the electronic device may switch the unread message displayed in the unread message display area to the next unread message of the unread message currently displayed. When detecting a downward slide operation acting on the unread message display area, the electronic device may switch the unread message displayed in the unread message display area to the previous unread message of the unread message currently displayed. An unread message ranking rule of the sending user may be preset. For example, unread messages sent by the target sending user to the initiating user are ranked according to the sequential order of sending time or receiving time. Therefore, when receiving a trigger operation for displaying an unread message sent by a certain sending user, the electronic device may rank multiple unread messages sent by the sending user according to the ranking rule to obtain an unread message list of the sending user. Moreover, when receiving the second trigger operation, the electronic device determines the next unread message or the previous unread message of the unread message currently displayed in the unread message display area based on the unread message list.

In an embodiment, the unread message display method according to this embodiment may also include the following: If the unread message sent by the target sending user other than the current unread message does not exist, a user switching control is displayed in the unread message display area; and when a third trigger operation acting on the user switching control is received, an unread message sent by a sending user other than the target sending user is displayed in the unread message display area; and/or, if the unread message sent by the target sending user other than the current unread message does not exist, a session control is displayed on the message list page; and when a fourth trigger operation acting on the session control is received, the current display page is switched to a session page of the target sending user. After the target unread message corresponding to the target unread message thumbnail is displayed in the unread message display area, the method further includes switching the target unread message from the unread state to the read state.

In the preceding embodiment, after viewing all unread messages sent by the target sending user, the initiating user may continue to view an unread message sent by another sending user or enter the session page with the target sending user to chat with the target sending user.

A determination rule for the electronic device to determine whether the unread message sent by the target sending user other than the current unread message exists may be set according to requirements. For example, when receiving the second trigger operation, the electronic device may determine whether the target sending user has sent another unread message in the unread state except the unread message currently displayed in the unread message display area. In a case where other than the unread message currently displayed in the unread message display area, another unread message in the unread state and sent by the target sending user exists, it is determined that the unread message sent by the target sending user other than the current unread message does exist. In a case where other than the unread message currently displayed in the unread message display area, the unread message in the unread state and sent by the target sending user does not exist, it is determined that no unread message sent by the target sending user exists other than the current unread message. Alternatively, when receiving the second trigger operation, the electronic device may also determine an unread message to be displayed in response to the second trigger operation and determine whether another unread message in the unread state and sent by the target sending user exists other than the unread message to be displayed in response to the second trigger operation. In a case where another unread message in the unread state and sent by the target sending user exists other than the unread message to be displayed in response to the second trigger operation, it is determined that an unread message sent by the target sending user other than the unread message to be displayed in response to the second trigger operation exists. In a case where no unread message in the unread state sent by the target sending user exists other than the unread message to be displayed in response to the second trigger operation, it is determined that no unread message sent by the target sending user exists other than the unread message to be displayed in response to the second trigger operation.

Figure 5:
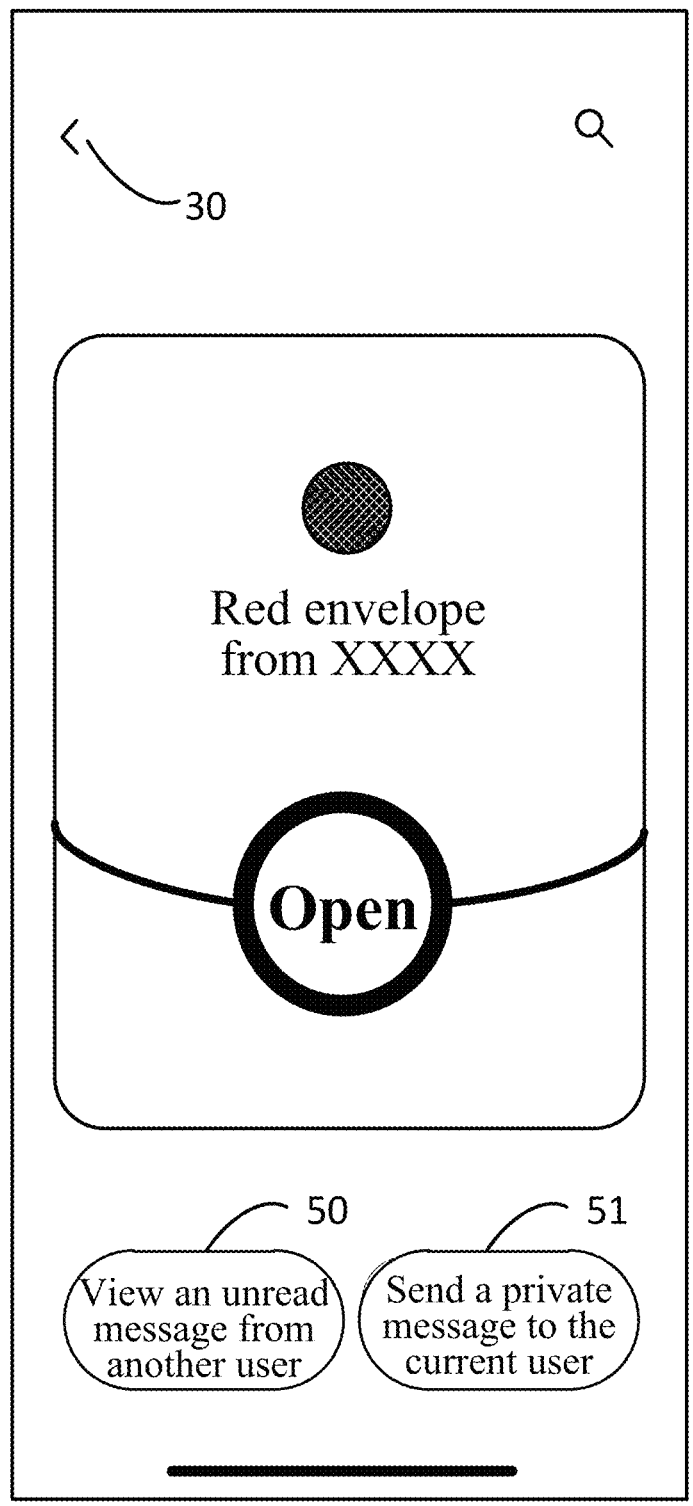
FIG. 5 is a diagram illustrating a third unread message display area according to an embodiment of the present disclosure.

Exemplarily, when displaying any unread message of the target sending user in the unread message display area, the electronic device may switch this unread message from the unread state to the read state. When the current condition meets a trigger condition for determining whether an unread message sent by the target sending user other than the current unread message exists, for example, when the second trigger operation is received, the electronic device determines whether an unread message sent by the target sending user other than the current unread message exists. Moreover, when determining that the unread message sent by the target sending user other than the current unread message does not exist, the electronic device displays the user switching control 50 and/or the session control 51 in the unread message display area, as shown in FIG. 5 (FIG. 5 illustrates an example in which both the user switching control 50 and the session control 51 are displayed). Therefore, when intending to continue to view an unread message sent by another sending user, the initiating user may trigger (for example, click or drag) the user switching control 50. Accordingly, when the electronic device detects that the initiating user triggers the user switching control 50 in the unread message display area, the electronic device may determine the next sending user according to a preset user switching rule, for example, according to the order of the number of interactions with the initiating user from high to low or according to the order of the sending time of the last unread message from earliest to latest. The next sending user is taken as a new target sending user. An unread message sent by this new target sending user is displayed in the unread message display area, and S104 is returned to be executed. When the initiating user intends to have a session with the target sending user, for example, intending to reply to a certain unread message sent by the target sending user, the initiating user may trigger (for example, click or drag) the session control 51. Accordingly, when the electronic device detects that the initiating user triggers the session control 51 in the unread message display area, the electronic device may switch the current display page to the session page between the initiating user and the target sending user, so that the initiating user may have a session with the target sending user on the session page.

It is to be understood that the electronic device may switch, based on the unread message list of the target sending user, the unread message of the target sending user displayed in the unread message display area. When a certain unread message of the target sending user is switched from the unread state to the read state, an operation for deleting the unread message from the unread message list of the target sending user may or may not be performed. This is not limited in this embodiment. Additionally, the user switching control and/or the session control may be always in the display state in the unread message display area, enabling the initiating user to switch the target sending user or have a session with the target sending user at any time. When the electronic device detects that the initiating user triggers the session control in the unread message display area, the session window may also be popped up on the message session page. Therefore, the initiating user may directly have a session with the target sending user in the session area.

In an embodiment, the unread message display method according to this embodiment also includes the following: a fifth trigger operation acting on a return control in the unread message display area is received, and in response to the fifth trigger operation, the current display page is switched to the session page of the target sending user.

The fifth trigger operation may be understood as a trigger operation acting on the return control in the unread message display area.

In the preceding embodiment, the electronic device may return to the session page between the initiating user and the target sending user based on the fifth trigger operation of the initiating user to enable the initiating user to have a session with the target sending user. In an embodiment, the electronic device displays the unread message sent by the target sending user in the unread message display area. When the initiating user intends to stop viewing the unread message sent by the target sending user or intends to have a session with the target sending user, the initiating user may click the return control 30 in the unread message display area, as shown in FIGS. 3 to 5. Accordingly, when the electronic device detects that the initiating user clicks the return control 30 in the unread message display area, the electronic device may switch the current display page to the session page between the initiating user and the target sending user so that the initiating user may have a session with the target sending user on the session page. Moreover, when the initiating user intends to continue to view the message list page, the initiating user may click a list return control on the session page. Therefore, when the electronic device detects that the initiating user clicks the list return control on the session page, the electronic device may switch the current display page from the session page between the initiating user and the target sending user to the message list page.

For the unread message display method and apparatus, the electronic device, and the storage medium according to this embodiment, a message list page is displayed, and an unread message thumbnail is displayed on the message list page. When a first trigger operation acting on a target unread message thumbnail is received, an unread message display area is displayed; and a target unread message corresponding to the target unread message thumbnail is displayed in the unread message display area. When a second trigger operation for switching the current unread message displayed in the unread message display area is received, the current unread message displayed in the unread message display area is switched to an unread message sent by a target sending user, who sends the target unread message, other than the current unread message. The current unread message includes the target unread message. Through the preceding technical schemes in this embodiment, a user can view different unread messages received by the user through corresponding trigger operations acting on the unread message display area so that the user does not need to look for an unread message manually, and the case of missing an unread message can be avoided and an operation required for viewing an unread message is simplified.

Figure 6:
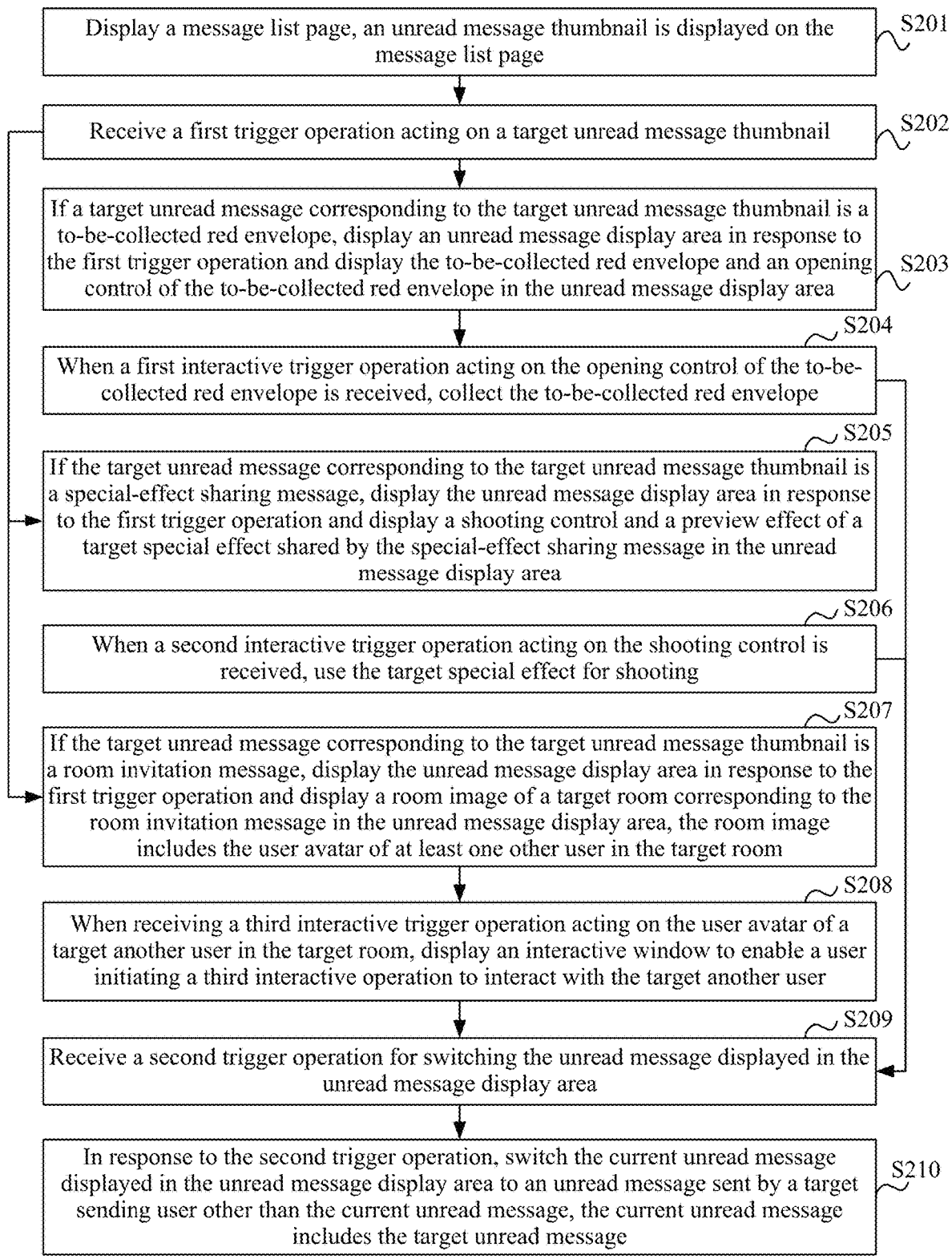
FIG. 6 is a flowchart of another unread message display method according to an embodiment of the present disclosure.

FIG. 6 is a flowchart of another unread message display method according to an embodiment of the present disclosure. The schemes in this embodiment may be combined with at least one alternative scheme in the preceding embodiments. In an embodiment, the target unread message may be a to-be-collected red envelope, the interactive control may be an opening control of the to-be-collected red envelope, and the step in which when the interactive trigger operation acting on the interactive control is received, the interactive operation corresponding to the interactive control is performed includes that when a first interactive trigger operation acting on the opening control of the to-be-collected red envelope is received, the to-be-collected red envelope is collected.

In an embodiment, the target unread message may be a special-effect sharing message, the interactive control may be a shooting control, the step in which the target unread message corresponding to the target unread message thumbnail is displayed in the unread message display area includes that a preview effect of a target special effect shared by the special-effect sharing message is displayed in the unread message display area, and the step in which when the interactive trigger operation acting on the interactive control is received, the interactive operation corresponding to the interactive control is performed includes that when a second interactive trigger operation acting on the shooting control is received, the target special effect is used for shooting.

In an embodiment, the target unread message may be a room invitation message, the interactive control includes a user avatar of another user in a target room, the step in which the target unread message corresponding to the target unread message thumbnail is displayed in the unread message display area includes that a room image of the target room corresponding to the room invitation message is displayed in the unread message display area, and the target room is a live room or a chat room, and the step in which when the interactive trigger operation acting on the interactive control is received, the interactive operation corresponding to the interactive control is performed includes that when a third interactive trigger operation acting on the user avatar of the target another user in the target room is received, an interactive window is displayed to enable a user initiating a third interactive operation to interact with the target another user.

As shown in FIG. 6, the unread message display method according to this embodiment may include the following:

In S201, a message list page is displayed, and an unread message thumbnail is displayed on the message list page.

In S202, a first trigger operation acting on a target unread message thumbnail is received, and S203, S205, or S207 is executed.

In S203, if a target unread message corresponding to the target unread message thumbnail is a to-be-collected red envelope, an unread message display area is displayed in response to the first trigger operation, and the to-be-collected red envelope and an opening control of the to-be-collected red envelope are displayed in the unread message display area.

Exemplarily, as shown in FIG. 2, the electronic device displays the red envelope unread message thumbnail (reference sign 20) of the to-be-collected red envelope (that is, the unread message thumbnail of the to-be-collected red envelope) on the message list page. When the initiating user intends to check the to-be-collected red envelope, the initiating user may click the red envelope unread message thumbnail (reference sign 20) of the to-be-collected red envelope displayed on the message list page. Accordingly, when the electronic device detects that the initiating user performs an operation of clicking the red envelope unread message thumbnail (reference sign 20) of the to-be-collected red envelope, the electronic device displays the unread message display area and displays the to-be-collected red envelope and the opening control 31 of the to-be-collected red envelope in the unread message display area, as shown in FIGS. 3 and 4.

In S204, when a first interactive trigger operation acting on the opening control of the to-be-collected red envelope is received, the to-be-collected red envelope is collected, and S209 is executed.

The first interactive trigger operation may be understood as an interactive trigger operation for collecting the to-be-collected red envelope displayed in the unread message display area, for example, an operation of clicking the display area of the to-be-collected red envelope or clicking the opening control of the to-be-collected red envelope. An example in which the first interactive trigger operation is the operation of clicking the opening control of the to-be-collected red envelope is taken for description hereinafter.

Exemplarily, as shown in FIGS. 3 and 4, the electronic device displays the to-be-collected red envelope in the unread message display area. When the initiating user intends to open the to-be-collected red envelope, the initiating user clicks the opening control 31 of the to-be-collected red envelope. Accordingly, when the electronic device detects a click operation acting on the opening control 31 of the to-be-collected red envelope, the electronic device displays a collected image when the collection of the to-be-collected red envelope is complete. Moreover, the account balance of an account logged in by the initiating user may be modified correspondingly based on the amount in the to-be-collected red envelope.

In S205, if the target unread message corresponding to the target unread message thumbnail is a special-effect sharing message, the unread message display area is displayed in response to the first trigger operation, and a shooting control and a preview effect of a target special effect shared by the special-effect sharing message are displayed in the unread message display area.

The target special effect is shared by the special-effect sharing message whose unread message thumbnail is triggered by the initiating user.

In this embodiment, when it is detected that the initiating user clicks the unread message thumbnail of a certain special-effect sharing message displayed on the message list page, a preview effect of the target special effect shared by the special-effect sharing message may be displayed directly in the unread message display area, so that the initiating user visually views the target special effect shared by the special-effect sharing message. Moreover, the following case is avoided: When a user intends to view the target special effect shared by the certain special-effect sharing message, the user needs to control the electronic device through the corresponding trigger operation for displaying the special-effect sharing message to completely display the special-effect sharing message first and also needs to perform the corresponding trigger operation for viewing the preview effect of the target special effect to switch the current display page to a shooting preview page so as to implement the display of the preview effect of the target special effect shared by the special-effect sharing message. In this case, an operation required for the initiating user viewing the target special effect is simplified.

Exemplarily, as shown in FIG. 2, the electronic device displays the special effect unread message thumbnail (reference sign 21) of the special-effect sharing message (that is, the unread message thumbnail of the special-effect sharing message) on the message list page. When the initiating user intends to view the target special effect shared by the special-effect sharing message, the initiating user may click the special effect unread message thumbnail (reference sign 21) of the special-effect sharing message displayed on the message list page. Accordingly, when the electronic device detects that the initiating user clicks the unread message thumbnail (reference sign 21) of a certain special-effect sharing message, the electronic device may control a camera to collect an image and display, in the unread message display area, the shooting control and the image collected by the camera after the target special effect shared by the special-effect sharing message is added, so that the initiating user visually views the shooting effect with the target special effect.

In S206, when a second interactive trigger operation acting on the shooting control is received, the target special effect is used for shooting, and S209 is executed.

The second interactive trigger operation is any interactive trigger operation capable of triggering the shooting control in the unread message display area, for example, an operation of clicking the shooting control in the unread message display area or an operation of triggering the shooting control in the unread message display area through a sound command to instruct the electronic device to perform shooting. This is not limited in this embodiment.

Exemplarily, the electronic device displays the shooting control and the shooting image with the target special effect in the unread message display area. When the initiating user intends to use the target special effect for shooting, the initiating user triggers the shooting control displayed in the unread message display area. Accordingly, when the electronic device detects that the initiating user triggers the shooting control in the unread message display area, the electronic device may shoot an image with the target special effect.

In S207, if the target unread message corresponding to the target unread message thumbnail is a room invitation message, the unread message display area is displayed in response to the first trigger operation, a room image of a target room corresponding to the room invitation message is displayed in the unread message display area, the target room is a live room or a chat room, and the room image includes the user avatar of at least one another user in the target room.

The room invitation message may include a live room invitation message and/or a chat room invitation message. Accordingly, the target room may include a live room to be entered through the invitation of the live room invitation message or a chat room to be entered through the invitation of the chat room invitation message, for example, a two-person chat room or a multi-person chat room. The avatar of another user displayed in the room image may include, for example, the avatar of the host, the avatar of a user giving a gift to the host, and/or the avatar of a user sending a chat message in the target room (for example, both the chat message and the avatar of the user sending the chat message are displayed).

Referring to FIG. 2, the electronic device displays the live room unread message thumbnail (reference sign 22) of the live room invitation message (that is, the unread message thumbnail of the live room invitation message) and/or the chat room unread message thumbnail (reference sign 23) of the chat room invitation message (that is, the unread message thumbnail of the chat room invitation message) on the message list page. Therefore, when the initiating user intends to enter a live room invited to be entered by a certain live room invitation message, the initiating user may click the live room unread message thumbnail (reference sign 22) of the live room invitation message displayed on the message list page. Accordingly, when the electronic device detects that the initiating user clicks the live room unread message thumbnail (reference sign 22) of the certain live room invitation message displayed on the message list page, the electronic device displays the unread message display area and displays a live room image of the live room corresponding to the live room invitation message in the unread message display area to enable the initiating user to watch the live; and/or, when the initiating user intends to enter a chat room invited to be entered by a certain chat room invitation message, the initiating user may click the chat room unread message thumbnail (reference sign 23) of the chat room invitation message displayed on the message list page. Accordingly, when the electronic device detects that the initiating user clicks the chat room unread message thumbnail (reference sign 23) of the certain chat room invitation message displayed on the message list page, the electronic device displays the unread message display area and displays a chat room image of the chat room corresponding to the chat room invitation message, for example, a video image of a video played in the chat room, in the unread message display area to enable the initiating user to watch.

In S208, when a third interactive trigger operation acting on the user avatar of a target another user in the target room is received, an interactive window is displayed for a user initiating a third interactive operation to interact with the target another user.

The third interactive trigger operation may be understood as an interactive trigger operation for triggering any interactive control that is used for interacting with another user in the room and in the target room, for example, an operation of clicking the user avatar of another user in the target room.

The target another user may be the another user corresponding to the third interactive operation, for example, the another user on whose avatar the third interactive operation is acted.

Exemplarily, the electronic device displays the room image of the target room in the unread message display area. When the initiating user intends to interact with a certain another user in the target room, the initiating user may click the avatar of the user displayed in the unread message display area. Accordingly, when the electronic device detects that the initiating user clicks the avatar of the certain another user in the target room, the electronic device may display an interactive window of the another user, for example, a chat window of the another user, to enable the initiating user to interact with the another user.

Moreover, the interactive control may also include a host interactive control for interacting with the host of the target room, for example, a gift control for sending a gift to the host and/or a chat area for sending chat content. Therefore, the initiating user may click the corresponding host interactive control to interact with the host, for example, to send a gift to the host or to send a chat message in the target room.

It is to be understood that the electronic device may also display, on the message list page, the text unread message thumbnail of a text message in the unread state, the video unread message thumbnail of a video message in the unread state, the voice unread message thumbnail of a voice message in the unread state, the game unread message thumbnail of a game invitation message in the unread state, and/or the link unread message thumbnail of a link-type message in the unread state. Accordingly, when the electronic device detects that the initiating user clicks the text unread message thumbnail of a certain text message displayed on the message list page, the electronic device may display the unread message display area and display the message content of the text message in the unread message display area. When the electronic device detects that the initiating user clicks the video unread message thumbnail of a certain video message displayed on the message list page, the electronic device may display the unread message display area and play a video included in the video message in the unread message display area. When the electronic device detects that the initiating user clicks the voice unread message thumbnail of a certain voice message displayed on the message list page, the electronic device may display the unread message display area, display the voice message in the unread message display area, and play the voice content included in the voice message in the unread message display area. When the electronic device detects that the initiating user clicks the game invitation message thumbnail of a certain game invitation message displayed on the message list page, the electronic device may display the unread message display area and display a game image of a game corresponding to the game invitation message in the unread message display area. Alternatively, when the electronic device detects that the initiating user clicks the link unread message thumbnail of a certain link-type message displayed on the message list page, the electronic device may display the unread message display area and display the content corresponding to a link in the link-type unread message in the unread message display area.

In S209, a second trigger operation for switching the unread message displayed in the unread message display area is received.

In S210, in response to the second trigger operation, the current unread message displayed in the unread message display area is switched to an unread message sent by a target sending user other than the current unread message, and the current unread message includes the target unread message.

For the unread message display method according to this embodiment, when it is detected that a user triggers an unread message thumbnail of an interactive message, for example, a to-be-collected red envelope, a special-effect sharing message, or a room invitation message, in an unread message display area, a corresponding interactive control and an image after the interactive message is triggered are directly displayed in the unread message display area. Moreover, the corresponding interactive operation is performed when the user triggers the interactive control, so that an operation required for the user viewing the interactive message is simplified and a timely interaction is performed, thereby improving the user experience.

Figure 7:
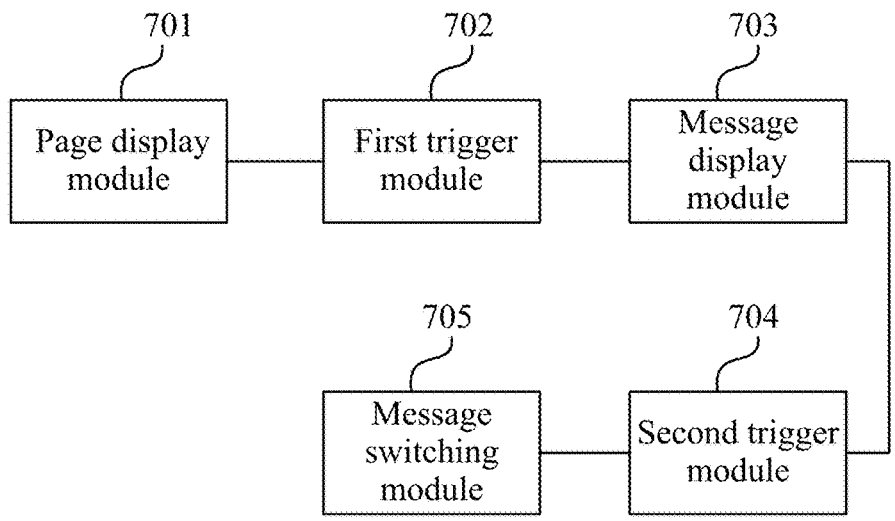
FIG. 7 is a block diagram of an unread message display apparatus according to an embodiment of the present disclosure.

FIG. 7 is a block diagram of an unread message display apparatus according to an embodiment of the present disclosure. The apparatus may be implemented in software and/or hardware and may be configured in an electronic device, typically, a mobile phone or a tablet computer. The apparatus may display an unread message by performing the unread message display method. As shown in FIG. 7, the unread message display apparatus according to this embodiment may include a page display module 701, a first trigger module 702, a message display module 703, a second trigger module 704, and a message switching module 705.

The page display module 701 is configured to display a message list page, and an unread message thumbnail is displayed on the message list page.

The first trigger module 702 is configured to receive a first trigger operation acting on a target unread message thumbnail.

The message display module 703 is configured to, in response to the first trigger operation, display an unread message display area and display a target unread message corresponding to the target unread message thumbnail in the unread message display area.

The second trigger module 704 is configured to receive a second trigger operation for switching the current unread message displayed in the unread message display area, and the current unread message includes the target unread message.

The message switching module 705 is configured to, in response to the second trigger operation, switch the current unread message displayed in the unread message display area to an unread message sent by a target sending user other than the current unread message, and the target sending user is a user sending the target unread message.

In the unread message display apparatus according to this embodiment, a message list page is displayed through the page display module and an unread message thumbnail is displayed on the message list page. A first trigger operation acting on a target unread message thumbnail is received through the first trigger module. Through the message display module, in response to the first trigger operation, the unread message display area is displayed and a target unread message corresponding to the target unread message thumbnail is displayed in the unread message display area. A second trigger operation for switching the current unread message displayed in the unread message display area is received through the second trigger module. Through the message switching module, in response to the second trigger operation, the current unread message displayed in the unread message display area is switched to an unread message sent by a target sending user other than the current unread message, and the current unread message includes the target unread message. Through the preceding technical schemes in this embodiment, a user can view different unread messages received by the user through corresponding trigger operations acting on the unread message display area so that the user does not need to look for an unread message manually, the case of missing an unread message can be avoided and an operation required for viewing an unread message is simplified.

In an embodiment, the unread message other than the current unread message may include an unread message having a different message type from the current unread message.

Alternatively, the unread message display apparatus according to this embodiment further includes a user switching module, and/or, a first session module. The user switching module is configured to perform the following: When the unread message sent by the target sending user other than the current unread message does not exist, a user switching control is displayed in the unread message display area; and when a third trigger operation acting on the user switching control is received, an unread message sent by a sending user other than the target sending user is displayed in the unread message display area. The first session module is configured to perform the following: When the unread message sent by the target sending user other than the current unread message does not exist, a session control is displayed on the message list page; and when a fourth trigger operation acting on the session control is received, the current display page is switched to a session page of the target sending user. The apparatus also includes a state switching module. The state switching module is configured to switch the target unread message from the unread state to the read state after the target unread message corresponding to the target unread message thumbnail is displayed in the unread message display area.

Alternatively, the unread message display apparatus according to this embodiment also includes a second session module. The second session module is configured to receive a fifth trigger operation acting on a return control in the unread message display area and switch the current display page to the session page of the target sending user in response to the fifth trigger operation.

In an embodiment, the target unread message may be an interactive unread message. The unread message display apparatus according to this embodiment also includes an interactive control display module and an interactive module. The interactive control display module is configured to display an interactive control in the unread message display area. The interactive module is configured to perform an interactive operation corresponding to the interactive control when an interactive trigger operation acting on the interactive control is received.

In an embodiment, the target unread message may be a to-be-collected red envelope. The interactive control may be an opening control of the to-be-collected red envelope. The interactive module may be configured to collect the to-be-collected red envelope when a first interactive trigger operation acting on the opening control of the to-be-collected red envelope is received.

In an embodiment, the target unread message may be a special-effect sharing message. The interactive control may be a shooting control. The message display module 703 may be configured to display the unread message display area in response to the first trigger operation and display a preview effect of a target special effect shared by a special-effect sharing message in the unread message display area. The interactive module may be configured to use the target special effect for shooting when a second interactive trigger operation acting on the shooting control is received.

In an embodiment, the target unread message may be a room invitation message. The interactive control may be the user avatar of another user in a target room. The message display module 703 may be configured to display the unread message display area in response to the first trigger operation and display a room image of the target room corresponding to the room invitation message in the unread message display area, and the target room is a live room or a chat room. The interactive module may be configured to, when a third interactive trigger operation acting on the user avatar of a target another user in the target room is received, display an interactive window to enable a user initiating a third interactive operation to interact with the target another user.

The unread message display apparatus according to this embodiment of the present disclosure may perform the unread message display method according to any embodiment of the present disclosure and has corresponding functional modules for performing the unread message display method. For technical details not described in detail in this embodiment, see the unread message display method according to any embodiment of the present disclosure.

Figure 8:
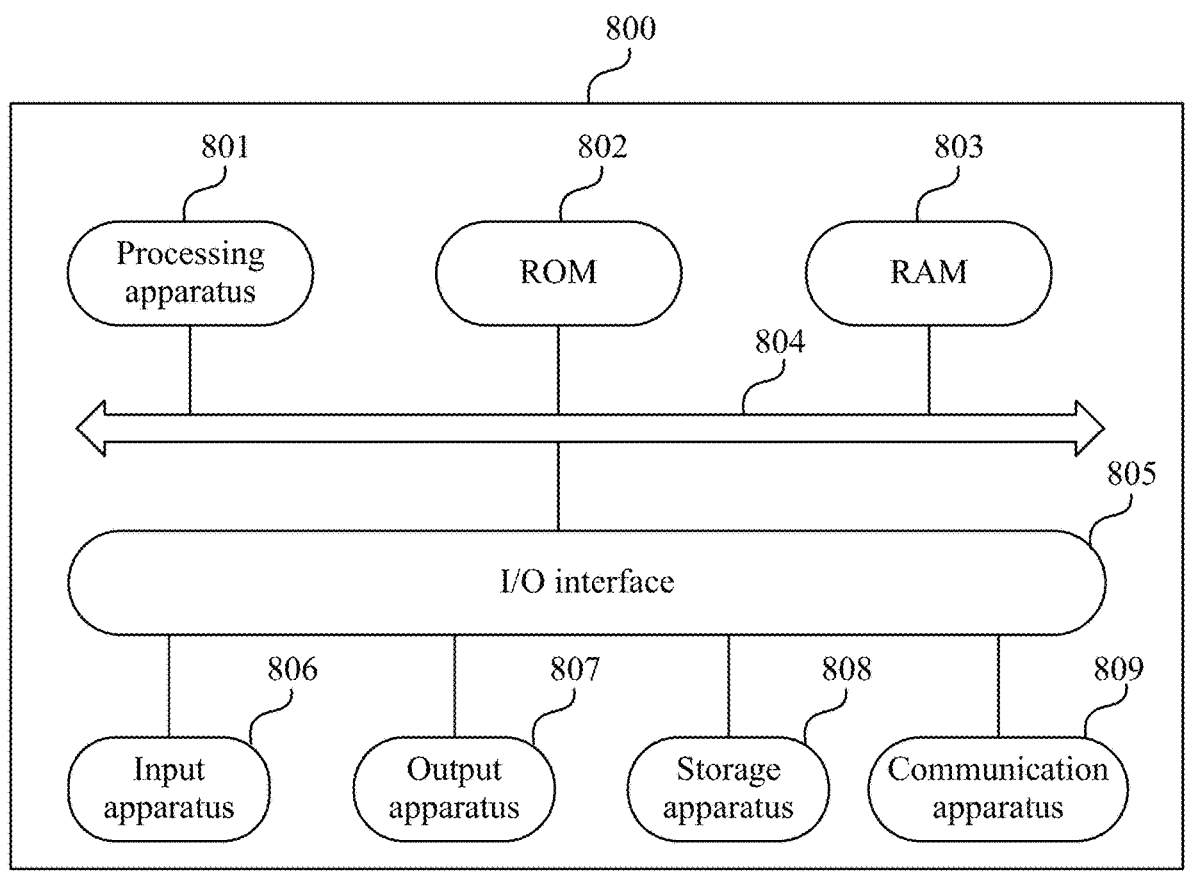
FIG. 8 is a structural diagram of an electronic device according to an embodiment of the present disclosure.

Referring to FIG. 8, FIG. 8 shows a structural diagram of an electronic device (such as a terminal device) 800 suitable for implementing embodiments of the present disclosure. The terminal device in embodiments of the present disclosure may include, but is not limited to, mobile terminals such as a mobile phone, a laptop, a digital broadcast receiver, a personal digital assistant (PDA), a portable Android device (PAD), a portable media player (PMP), and an in-vehicle terminal (such as an in-vehicle navigation terminal) and stationary terminals such as a digital television (TV) and a desktop computer. The electronic device shown in FIG. 8 is an example and is not intended to limit the function and use range of embodiment of the present disclosure.

As shown in FIG. 8, the electronic device 800 may include a processing apparatus (such as a central processing unit or a graphics processing unit) 801. The processing apparatus 801 may perform various proper actions and processing according to a program stored in a read-only memory (ROM) 802 or a program loaded into a random-access memory (RAM) 803 from a storage apparatus 806. Various programs and data required for operations of the electronic device 800 are also stored in the RAM 803. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 such as a touch screen, a touchpad, a keyboard, a mouse, a camera, a microphone, an accelerometer, or a gyroscope; an output apparatus 807 such as a liquid crystal display (LCD), a speaker, or a vibrator; the storage apparatus 806 such as a magnetic tape or a hard disk; and a communication apparatus 809. The communication apparatus 809 may allow the electronic device 800 to perform wireless or wired communication with other devices to exchange data. Although FIG. 8 shows the electronic device 800 having various apparatuses, it is to be understood that it is not required to implement or have all the shown apparatuses. Alternatively, more or fewer apparatuses may be implemented or included.

Particularly, according to the embodiments of the present disclosure, the processes described above with reference to the flowcharts may be implemented as computer software programs. For example, a computer program product is included in the embodiment of the present disclosure. The computer program product includes a computer program carried on a non-transitory computer-readable medium. The computer program includes program codes for performing the methods shown in the flowcharts. In such embodiments, the computer program may be downloaded and installed from a network through the communication apparatus 809, installed from the storage apparatus 806, or installed from the ROM 802. When the computer program is executed by the processing apparatus 801, the preceding functions defined in the methods in embodiments of the present disclosure are implemented.

It is to be noted that the preceding computer-readable medium in the present disclosure may be a computer-readable signal medium or a computer-readable storage medium or any combination thereof. For example, the computer-readable storage medium may be, but is not limited to, an electrical, magnetic, optical, electromagnetic, infrared or semiconductor system, apparatus or device or any combination thereof. Specifically, the computer-readable storage medium may include, but is not limited to, an electrical connection having one or more wires, a portable computer disk, a hard disk, a random access memory (RAM), a read-only memory (ROM), an erasable programmable read-only memory (EPROM) or flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program that can be used by or in connection with an instruction execution system, apparatus or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable signal medium may send, propagate or transmit a program used by or in connection with an instruction execution system, apparatus or device. Program codes included on the computer-readable medium may be transmitted by any suitable medium, including, but not limited to, a wire, an optical cable, a radio frequency (RF), or any suitable combination thereof.

In some embodiments, clients and servers may communicate using any currently known or future developed network protocol, such as the hypertext transfer protocol (HTTP), and may be interconnected with any form or medium of digital data communication (such as a communication network). Examples of the communication network include a local area network (LAN), a wide area networks (WAN), an internet (for example, the Internet), a peer-to-peer network (for example, an Ad-Hoc network), and any network currently known or to be developed in the future.

The preceding computer-readable medium may be included in the preceding electronic device or may exist alone without being assembled into the electronic device.

The preceding computer-readable medium carries at least one program. When executed by the electronic device, the preceding at least one program causes the electronic device to perform the following: A message list page is displayed, and an unread message thumbnail is displayed on the message list page. A first trigger operation acting on a target unread message thumbnail is received. In response to the first trigger operation, an unread message display area is displayed; and a target unread message corresponding to the target unread message thumbnail is displayed in the unread message display area. A second trigger operation for switching the current unread message displayed in the unread message display area is received, and the current unread message includes the target unread message. In response to the second trigger operation, the current unread message displayed in the unread message display area is switched to an unread message sent by a target sending user other than the current unread message, and the target sending user is a user sending the target unread message.

Computer program codes for executing operations in the present disclosure may be written in one or more programming languages or a combination thereof. The preceding programming languages include, but are not limited to, an object-oriented programming language such as Java, Smalltalk or C++ and may also include a conventional procedural programming language such as C or a similar programming language. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings show the possible architecture, function and operation of the system, method and computer program product according to various embodiments of the present disclosure. In this regard, each block in the flowcharts or block diagrams may represent a module, program segment, or part of codes, where the module, program segment, or part of codes includes at least one executable instruction for implementing specified logical functions. It is to be noted that in some alternative implementations, the functions marked in the blocks may occur in an order different from that marked in the drawings. For example, two successive blocks may, in practice, be executed substantially in parallel or executed in a reverse order, which depends on the functions involved. It is also to be noted that each block in the block diagrams and/or flowcharts and a combination of blocks in the block diagrams and/or flowcharts may be implemented by a special-purpose hardware-based system executing specified functions or operations or may be implemented by a combination of special-purpose hardware and computer instructions.

The units involved in the embodiments of the present disclosure may be implemented by software or hardware. The name of a module is not intended to limit the unit itself in a certain circumstance.

The functions described above herein may be at least partially implemented by at least one hardware logic component. For example, without limitation, example types of hardware logic components that can be used include a field-programmable gate array (FPGA), an application-specific integrated circuit (ASIC), an application-specific standard product (ASSP), a system-on-chip (SoC), a complex programmable logic device (CPLD), and the like.

In the context of the present disclosure, a machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. Concrete examples of the machine-readable storage medium include an electrical connection based on at least one wire, a portable computer disk, a hard disk, a random-access memory (RAM), a read-only memory (ROM), an erasable programmable read-only memory (EPROM) or a flash memory, an optical fiber, a portable compact disc read-only memory (CD-ROM), an optical storage device, a magnetic storage device, or any suitable combination thereof.

According to at least one embodiment of the present disclosure, example one provides an unread message display method. The method includes the following:

A message list page is displayed, and an unread message thumbnail is displayed on the message list page.

A first trigger operation acting on a target unread message thumbnail is received.

In response to the first trigger operation, an unread message display area is displayed and a target unread message corresponding to the target unread message thumbnail is displayed in the unread message display area.

A second trigger operation for switching the current unread message displayed in the unread message display area is received, and the current unread message includes the target unread message.

In response to the second trigger operation, the current unread message displayed in the unread message display area is switched to an unread message sent by a target sending user other than the current unread message, and the target sending user is a user sending the target unread message.

According to at least one embodiment of the present disclosure, for example two according to the method of example one, the unread message other than the current unread message includes an unread message having a different message type from the current unread message.

According to at least one embodiment of the present disclosure, example three according to the method of example one also includes the following:

If the target sending user does not send an unread message other than the current unread message, a user switching control is displayed in the unread message display area.

When a third trigger operation acting on the user switching control is received, an unread message sent by a sending user other than the target sending user is displayed in the unread message display area.

Moreover/alternatively, if the target sending user does not send an unread message other than the current unread message, a session control is displayed on the message list page.

When a fourth trigger operation acting on the session control is received, the current display page is switched to a session page of the target sending user.

After the target unread message corresponding to the target unread message thumbnail is displayed in the unread message display area, the method also includes the following:

The target unread message is switched from the unread state to the read state.

According to at least one embodiment of the present disclosure, example four according to the method of example one also includes the following:

A fifth trigger operation acting on a return control in the unread message display area is received.

In response to the fifth trigger operation, the current display page is switched to a session page of the target sending user.

According to at least one embodiment of the present disclosure, for example five according to the method of any one of examples one to four, the target unread message is an interactive unread message, and the method also includes the following:

An interactive control is displayed in the unread message display area.

When an interactive trigger operation acting on the interactive control is received, an interactive operation corresponding to the interactive control is performed.

According to at least one embodiment of the present disclosure, for example six according to the method of example five, the target unread message is a to-be-collected red envelope. The interactive control is an opening control of the to-be-collected red envelope. The step in which when the interactive trigger operation acting on the interactive control is received, the interactive operation corresponding to the interactive control is performed includes the following:

When a first interactive trigger operation acting on the opening control of the to-be-collected red envelope is received, the to-be-collected red envelope is collected.

According to at least one embodiment of the present disclosure, for example seven according to the method of example five, the target unread message is a special-effect sharing message. The interactive control is a shooting control. The step in which the target unread message corresponding to the target unread message thumbnail is displayed in the unread message display area includes the step below.

A preview effect of a target special effect shared by a special-effect sharing message is displayed in the unread message display area.

The step in which when the interactive trigger operation acting on the interactive control is received, the interactive operation corresponding to the interactive control is performed includes the following:

When a second interactive trigger operation acting on the shooting control is received, the target special effect is used for shooting.

According to at least one embodiment of the present disclosure, for example eight according to the method of example five, the target unread message is a room invitation message. The interactive control is the user avatar of another user in a target room. The step in which the target unread message corresponding to the target unread message thumbnail is displayed in the unread message display area includes the following:

A room image of the target room corresponding to the room invitation message is displayed in the unread message display area, and the target room is a live room or a chat room.

The step in which when the interactive trigger operation acting on the interactive control is received, the interactive operation corresponding to the interactive control is performed includes the following:

When a third interactive trigger operation acting on the user avatar of a target another user in the target room is received, an interactive window is displayed to enable a user initiating a third interactive operation to interact with the target another user.

According to at least one embodiment of the present disclosure, example nine provides an unread message display apparatus. The apparatus includes a page display module, a first trigger module, a message display module, a second trigger module, and a message switching module.

The page display module is configured to display a message list page, and an unread message thumbnail is displayed on the message list page.

The first trigger module is configured to receive a first trigger operation acting on a target unread message thumbnail.

The message display module is configured to, in response to the first trigger operation, display an unread message display area and display, in the unread message display area, a target unread message corresponding to the target unread message thumbnail.

The second trigger module is configured to receive a second trigger operation for switching the current unread message displayed in the unread message display area, and the current unread message includes the target unread message.

The message switching module is configured to, in response to the second trigger operation, switch the current unread message displayed in the unread message display area to an unread message sent by a target sending user other than the current unread message, and the target sending user is a user sending the target unread message.

According to at least one embodiment of the present disclosure, example ten provides an electronic device. The electronic device includes at least one processor and a memory configured to store at least one program.

When executed by the at least one processor, the at least one program causes the at least one processor to perform the unread message display method of any one of examples one to eight.

According to at least one embodiment of the present disclosure, example eleven provides a computer-readable storage medium for storing a computer program. When the computer program is executed by a processor, the unread message display method of any one of examples one to eight is performed.

Additionally, although operations are depicted in a particular order, this should not be construed as that these operations are required to be performed in the particular order shown or in a sequential order. In a certain environment, multitasking and parallel processing may be advantageous. Similarly, although several specific implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable sub-combination.

Although the subject matter has been described in a language specific to structural features and/or methodological logic acts, it is to be understood that the subject matter defined in the appended claims is not necessarily limited to the particular features or acts described above. Conversely, the particular features and acts described above are merely example forms for implementing the claims.

What is claimed is:

1. An unread message display method, comprising:
    displaying a message list page, wherein an unread message thumbnail is displayed on the message list page, and an unread message corresponding to the unread message thumbnail comprises a video message;

receiving a first trigger operation acting on a target unread message thumbnail;

in response to the first trigger operation, displaying an unread message display area and displaying a target unread message corresponding to the target unread message thumbnail in the unread message display area, wherein displaying the target unread message corresponding to the target unread message thumbnail in the unread message display area comprises: in response to the target unread message being the video message, playing the video message in the unread message display area, and the unread message display area is located at a same page as the message list page or a different page from the message list page;

receiving a second trigger operation for switching a current unread message displayed in the unread message display area, wherein the current unread message comprises the target unread message;

in response to the second trigger operation, switching the current unread message displayed in the unread message display area to an unread message sent by a target sending user other than the current unread message, wherein the target sending user is a user sending the target unread message; and after all unread messages sent by the target sending user are displayed, displaying at least one of a user switching control in the unread message display area or a session control on the message list page, in response to receiving a third trigger operation acting on the user switching control, displaying an unread message sent by a sending user other than the target sending user in the unread message display area, or in response to receiving a fourth trigger operation acting on the session control, switching a current display page to a session page of the target sending user.

2. The method according to claim 1, wherein the unread message other than the current unread message comprises an unread message having a different message type from the current unread message.

3. The method according to claim 1, wherein after displaying the target unread message corresponding to the target unread message thumbnail in the unread message display area, the method further comprises:

switching the target unread message from an unread state to a read state.

4. The method according to claim 1, further comprising:

receiving a fifth trigger operation acting on a return control in the unread message display area; and in response to the fifth trigger operation, switching a current display page to a session page of the target sending user.

5. The method according to claim 1, wherein the target unread message is an interactive unread message, and the method further comprises:

displaying an interactive control in the unread message display area; and in response to receiving an interactive trigger operation acting on the interactive control, performing an interactive operation corresponding to the interactive control.

6. The method according to claim 5, wherein the target unread message is a to-be-collected red envelope, the interactive control is an opening control of the to-be-collected red envelope, and in response to receiving the interactive trigger operation acting on the interactive control, performing the interactive operation corresponding to the interactive control comprises:

in response to receiving a first interactive trigger operation acting on the opening control of the to-be-collected red envelope, collecting the to-be-collected red envelope.

7. The method according to claim 5, wherein the target unread message is a special-effect sharing message, the interactive control is a shooting control, and displaying the target unread message corresponding to the target unread message thumbnail in the unread message display area comprises:

displaying, in the unread message display area, a preview effect of a target special effect shared by the special-effect sharing message; and in response to receiving the interactive trigger operation acting on the interactive control, performing the interactive operation corresponding to the interactive control comprises:

in response to receiving a second interactive trigger operation acting on the shooting control, using the target special effect for shooting.

8. The method according to claim 5, wherein the target unread message is a room invitation message, the interactive control comprises a user avatar of another user in a target room, and displaying the target unread message corresponding to the target unread message thumbnail in the unread message display area comprises:

displaying, in the unread message display area, a room image of the target room corresponding to the room invitation message, wherein the target room is a live room or a chat room; and in response to receiving the interactive trigger operation acting on the interactive control, performing the interactive operation corresponding to the interactive control comprises:

in response to receiving a third interactive trigger operation acting on a user avatar of a target another user in the target room, displaying an interactive window to enable a user initiating a third interactive operation to interact with the target another user.

9. An electronic device, comprising:

at least one processor; and a memory configured to store at least one program, wherein when executed by the at least one processor, the at least one program causes the at least one processor to perform the following:

displaying a message list page, wherein an unread message thumbnail is displayed on the message list page, and an unread message corresponding to the unread message thumbnail comprises a video message;

receiving a first trigger operation acting on a target unread message thumbnail;

in response to the first trigger operation, displaying an unread message display area and displaying a target unread message corresponding to the target unread message thumbnail in the unread message display area, wherein displaying the target unread message corresponding to the target unread message thumbnail in the unread message display area comprises: in response to the target unread message being the video message, playing the video message in the unread message display area, and the unread message display area is located at a same page as the message list page or a different page from the message list page;

receiving a second trigger operation for switching a current unread message displayed in the unread message display area, wherein the current unread message comprises the target unread message;

in response to the second trigger operation, switching the current unread message displayed in the unread message display area to an unread message sent by a target sending user other than the current unread message, wherein the target sending user is a user sending the target unread message; and after all unread messages sent by the target sending user are displayed, displaying at least one of a user switching control in the unread message display area or a session control on the message list page, in response to receiving a third trigger operation acting on the user switching control, displaying an unread message sent by a sending user other than the target sending user in the unread message display area, or in response to receiving a fourth trigger operation acting on the session control, switching a current display page to a session page of the target sending user.

10. The electronic device according to claim 9, wherein the unread message other than the current unread message comprises an unread message having a different message type from the current unread message.

11. The electronic device according to claim 9, wherein after displaying the target unread message corresponding to the target unread message thumbnail in the unread message display area, the at least one program causes the at least one processor to further perform the following:

switching the target unread message from an unread state to a read state.

12. The electronic device according to claim 9, wherein the at least one program causes the at least one processor to further perform the following:

receiving a fifth trigger operation acting on a return control in the unread message display area; and in response to the fifth trigger operation, switching a current display page to a session page of the target sending user.

13. The electronic device according to claim 9, wherein the target unread message is an interactive unread message, and the at least one program causes the at least one processor to further perform the following:

displaying an interactive control in the unread message display area; and in response to receiving an interactive trigger operation acting on the interactive control, performing an interactive operation corresponding to the interactive control.

14. The electronic device according to claim 13, wherein the target unread message is a to-be-collected red envelope, the interactive control is an opening control of the to-be-collected red envelope, and the at least one program causes the at least one processor to perform in response to receiving the interactive trigger operation acting on the interactive control, performing the interactive operation corresponding to the interactive control by:

in response to receiving a first interactive trigger operation acting on the opening control of the to-be-collected red envelope, collecting the to-be-collected red envelope.

15. The electronic device according to claim 13, wherein the target unread message is a special-effect sharing message, the interactive control is a shooting control, and the at least one program causes the at least one processor to perform displaying the target unread message corresponding to the target unread message thumbnail in the unread message display area by:

displaying, in the unread message display area, a preview effect of a target special effect shared by the special-effect sharing message; and the at least one program causes the at least one processor to perform in response to receiving the interactive trigger operation acting on the interactive control, performing the interactive operation corresponding to the interactive control by:

in response to receiving a second interactive trigger operation acting on the shooting control, using the target special effect for shooting.

16. The electronic device according to claim 13, wherein the target unread message is a room invitation message, the interactive control comprises a user avatar of another user in a target room, and the at least one program causes the at least one processor to perform displaying the target unread message corresponding to the target unread message thumbnail in the unread message display area by:

displaying, in the unread message display area, a room image of the target room corresponding to the room invitation message, wherein the target room is a live room or a chat room; and the at least one program causes the at least one processor to perform in response to receiving the interactive trigger operation acting on the interactive control, performing the interactive operation corresponding to the interactive control by:

in response to receiving a third interactive trigger operation acting on a user avatar of a target another user in the target room, displaying an interactive window to enable a user initiating a third interactive operation to interact with the target another user.

17. A non-transitory computer-readable storage medium for storing a computer program, wherein when executed by a processor, the computer program causes the processor to implement the following:

displaying a message list page, wherein an unread message thumbnail is displayed on the message list page, and an unread message corresponding to the unread message thumbnail comprises a video message;

receiving a first trigger operation acting on a target unread message thumbnail;

in response to the first trigger operation, displaying an unread message display area and displaying a target unread message corresponding to the target unread message thumbnail in the unread message display area, wherein displaying the target unread message corresponding to the target unread message thumbnail in the unread message display area comprises: in response to the target unread message being the video message, playing the video message in the unread message display area, and the unread message display area is located at a same page as the message list page or a different page from the message list page;

receiving a second trigger operation for switching a current unread message displayed in the unread message display area, wherein the current unread message comprises the target unread message;

in response to the second trigger operation, switching the current unread message displayed in the unread message display area to an unread message sent by a target sending user other than the current unread message, wherein the target sending user is a user sending the target unread message; and after all unread messages sent by the target sending user are displayed, displaying at least one of a user switching control in the unread message display area or a session control on the message list page, in response to receiving a third trigger operation acting on the user switching control, displaying an unread message sent by a sending user other than the target sending user in the unread message display area, or in response to receiving a fourth trigger operation acting on the session control, switching a current display page to a session page of the target sending user.

18. The storage medium according to claim 17, wherein the unread message other than the current unread message comprises an unread message having a different message type from the current unread message.

19. The storage medium according to claim 17, wherein the target unread message is an interactive unread message, and the computer program causes the processor to further implement:
  displaying an interactive control in the unread message display area; and
  in response to receiving an interactive trigger operation acting on the interactive control, performing an interactive operation corresponding to the interactive control;
  wherein the target unread message is a to-be-collected red envelope, the interactive control is an opening control of the to-be-collected red envelope, and the computer program causes the processor to implement performing the interactive operation corresponding to the interactive control, in response to receiving the interactive trigger operation acting on the interactive control by:
    in response to receiving a first interactive trigger operation acting on the opening control of the to-be-collected red envelope, collecting the to-be-collected red envelope.

20. The storage medium according to claim 17, wherein the target unread message is an interactive unread message, and the computer program causes the processor to further implement:
  displaying an interactive control in the unread message display area; and
  in response to receiving an interactive trigger operation acting on the interactive control, performing an interactive operation corresponding to the interactive control;
  wherein the target unread message is a special-effect sharing message, the interactive control is a shooting control,
  the computer program causes the processor to implement displaying the target unread message corresponding to the target unread message thumbnail in the unread message display area by:
  displaying, in the unread message display area, a preview effect of a target special effect shared by the special-effect sharing message; and
  the computer program causes the processor to implement performing the interactive operation corresponding to the interactive control, in response to receiving the interactive trigger operation acting on the interactive control by:
  in response to receiving a second interactive trigger operation acting on the shooting control, using the target special effect for shooting.

\* \* \* \* \*